United States Patent

[11] 3,554,421

[72] Inventor John H. Streeter
Ilford, England
[21] Appl. No. 736,137
[22] Filed June 11, 1968
[45] Patented Jan. 12, 1971
[73] Assignee The Plessey Company Limited
Ilford, England
a British company
[32] Priority June 12, 1967
[33] Great Britain
[31] No. 27083/67

[54] INCREMENTAL TAPE DRIVE
5 Claims, 2 Drawing Figs.

[52] U.S. Cl. 226/145, 226/150, 226/113, 226/188
[51] Int. Cl. G11b 15/20
[50] Field of Search 226/120, 188, 113, 145, 150

[56] References Cited

UNITED STATES PATENTS

| | | | |
|---|---|---|---|
| 2,858,131 | 10/1958 | Leshner | 226/113X |
| 3,326,437 | 6/1967 | Stemme | 226/113 |
| 3,454,206 | 7/1969 | Williams | 226/188X |

*Primary Examiner*—Allen N. Knowles
*Attorney*—Blum, Moscovitz, Friedman & Kaplan

ABSTRACT: An incremental tape drive actuator for a tape recorder comprises two supports in which means to deflect a magnetic tape from the shortest path between the supports comprises a vibratory reed. Movement of the reed is synchronized with the actuation of tape brakes and feeding speeds up to 350 or more increments per second are possible.

INCREMENTAL TAPE DRIVE

This invention relates to tape recorders. It relates specifically to the provision of an actuator whereby a magnetic tape can be moved in steps past a magnetic tape head of a tape recorder.

According to one feature of the invention, an incremental tape drive actuator for a tape recorder comprises two supports in which means to deflect a magnetic tape from the shortest path between the supports comprises a vibratory reed. Preferably vibration of the reed is effected electromagnetically. The movement of the reed may be arranged to pull more tape past the tape head than is actually required for each stroke, and the required increment of tape pulled is then determined by the timed operation of brake means adjacent the two supports. In this way the reed may be arranged to pull between six and seven thousandths of an inch of tape and operation of the timing mechanism for the brakes may be arranged so that each stroke of the reed in fact pulls a shorter length.

Conveniently the brake means adjacent the two tape supports are arranged to be operated electromagnetically. The electromagnetic actuation of the reed is preferably arranged to draw the reed away from the magnetic tape so that upon canceling the magnetic field the reed will move away from a magnetic core and build up kinetic energy which will be expended in deflecting the tape out of a straight line between the two supports. If the magnetic energy is reapplied on the rebound of the reed, the reed will be attracted to the magnetic core where it will remain having caused a single deflection of tape between the supports. If a brake between the actuator and a right-hand or tape takeup spool is applied and one between the actuator and a left-hand or tape feed spool is freed, this will cause an increment of tape to be fed into the space between the support. Reversal of this actuation of the brakes will cause the increment of tape to be fed towards the tape takeup spool. In this way the reed may be caused to feed tape at a rate of from zero to 350 or more increments per second.

Figure 1:
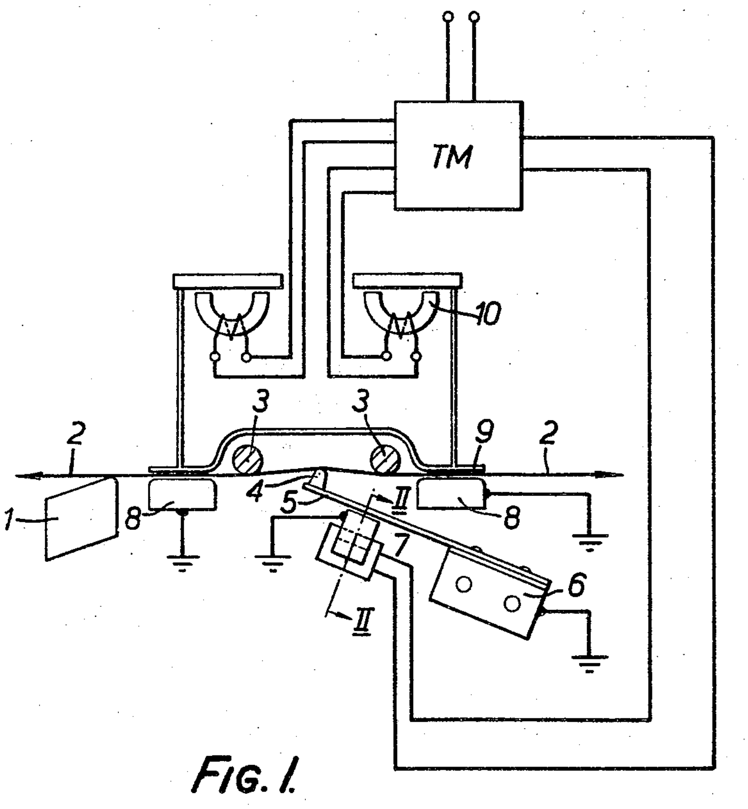
Figure 2:
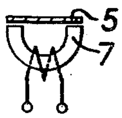

By way of example an embodiment of the invention will be further described with reference to the accompanying drawings in which:

FIG. 1 is a plan view of a tape head and feeding mechanism of a tape recorder, and FIG. 2 is a section along the line II–II of FIG. 1.

In FIG. 1 a tape feeding arrangement for a magnetic tape recorder is shown, the arrangement comprising a magnetic tape head 1 across which tape 2 is passed for operation of the recorder. The tape 2 is carried in its movement across the head by supports 3. The tape would normally lie in a straight line between the two supports 3 being retained in this condition by tensions applied to the ends of the tape from tape spools (not shown). The tape 2 however may be deflected from a straight line between the two supports 3 by means of a pad 4 carried on a reed 5. The reed 5 is mounted on a bracket 6 fastened to a deck of the tape recorder and the dimensions of the reed are such that it may be caused to vibrate and in this condition the pad 4 will deflect the tape 2 from a straight line between the supports 3.

The reed 5 may be caused to vibrate by actuation of a magnetic core 7 placed near the free end of the reed 5. Actuation of the core 7 then will draw the pad 4 away from the tape 2 and when the core 7 is deactuated the reed carrying the pad 4 will move away from the core by reason of the energy stored in the reed and the pad 4 will deflect the tape lying between the supports 3.

Lying along the line of the tape but outside the supports 3 two brakes 8 are provided to prevent movement of the tape 2. The brakes 8 include a movable brake shoe 9 which is electromagnetically actuated from a core 10 when required to prevent movement of the tape past either brake.

In operation of the tape feeding mechanism, the ends of the tape 2 as shown in FIG. 1 are under a slight tension as already explained by reason of the pull from tape spools in the recorder. If it is required to feed tape from the left to the right-hand side of the actuator the left-hand brake will be released the right-hand brake applied and the reed 5 carrying the pad 4 allowed to oscillate into the space between the supports 3 and out again where it is retained by a further actuation of the core 7. When the reed was in its position of maximum displacement from the core 7, the left-hand brake will have been applied and the right-hand brake freed to allow the increment of tape fed in this way to pass to the right-hand or takeup spool. The sequence of operations is thus as follows:

a. Standby with L.H. brake on, reed magnet on b. Release L.H. brake, apply R.H. brake, release reed magnet c. When reed has moved tape a sufficient distance, apply L.H. brake, release R.H. brake d. At time $T=\frac{1}{f}$ (where f= reed resonant frequency) from point (b) re-energize reed magnet. The system has now returned to the standby condition as at (a)-

Repetition of this procedure can cause the tape to flow rapidly in increments past the tape head and the movement may be effected equally easily in the reverse direction.

In a particular embodiment of the actuator that was constructed for experimental work, movement of the pad 4 was arranged to pull about six or seven thousandths of an inch of tape past the head with each stroke. The relative timing for the actuation of the brakes was coordinated such that this pulled increment was reduced to an actual 5,000 of tape feed for each stroke of the pad 4. The electromagnetic actuation of the brakes was of course effected through suitable control and timing mechanism TM and with this the tape could be arranged to move forward and backward or remain stationary whilst the pad 4 was operating. This embodiment of the actuator was found to be operable for feeding increments of tape at between zero and 350 cycles per second. With slight modification it was considered that the feeding rate might be increased to 400 or 500 cycles per second.

The foregoing description of an embodiment of the invention has been given by way of example only and a number of modifications may be made without departing from the scope of the invention. For instance, for a particular application it might be possible to replace the electromagnetic actuation of the brakes by mechanical operation. In addition the electromagnetic actuation of the brakes 8 has been shown as operating through a magnetic core like that of the core 7. This arrangement has been chosen because of the high speed of operation available. It would be possible alternatively to replace these magnetic cores with means such as solenoids if the required speed of operation of the actuator permitted this.

I claim:

1. An incremental tape drive actuator for a tape recorder comprising a pair of spaced tape supports positioned for the passage of the tape thereby; a vibratory reed fixedly mounted at one end; actuating means for actuating the vibration of said reed; and engaging means on said reed spaced from the fixed end thereof for engaging the tape intermediate said pair of supports for deflecting said tape from the shortest path between said supports in response to the vibration of said reed.

2. An incremental tape drive actuator as claimed in claim 1, in which the vibratory reed is actuated by electromagnetic means.

3. An incremental tape drive actuator as claimed in claim 1, including a pair of brake means positioned in the path of said tape one on each side of the region of said tape engageable by said engaging means in the vicinity of the two supports for said tape, said brake means being operable in predetermined sequence with the reed for the deflection of the tape and incremental stepping of the tape.

4. An incremental tape drive actuator as claimed in claim 3, in which the brake means are electromagnetically operated and including sequence control means for the control of the sequence of operations of the brake means and the reed.

5. An incremental tape drive actuator as claimed in claim 4, in which the sequence control means comprises timing means.